United States Patent [19]

Spils

[11] Patent Number: 4,607,819
[45] Date of Patent: Aug. 26, 1986

[54] HIGH PRESSURE RADIAL FLOW VALVE

[76] Inventor: Richard W. Spils, 2225 Spenard Rd., Anchorage, Ak. 99503

[21] Appl. No.: 732,171

[22] Filed: May 7, 1985

[51] Int. Cl.[4] .................. F16K 47/04; F16K 47/08
[52] U.S. Cl. .................................. 251/121; 251/127; 251/63.6; 166/91
[58] Field of Search ............... 251/127, 121, 63.5, 251/63.6; 137/625.3

[56] References Cited

U.S. PATENT DOCUMENTS

| | | | |
|---|---|---|---|
| 856,981 | 6/1907 | McCarroll | 251/57 |
| 1,558,330 | 10/1925 | Bain | 251/157 |
| 1,743,620 | 1/1930 | Quiroz et al. | 251/63.5 X |
| 1,919,232 | 7/1933 | Lee | 251/162 |
| 3,704,718 | 12/1972 | Rudel | 137/39 |
| 3,820,756 | 6/1974 | Meyer | 251/121 |
| 3,880,399 | 4/1975 | Luthe | 251/121 |

FOREIGN PATENT DOCUMENTS

| | | | |
|---|---|---|---|
| 1275407 | 10/1961 | France | 251/127 |
| 2284078 | 4/1976 | France | 251/127 |

Primary Examiner—Samuel Scott
Assistant Examiner—Allen J. Flanigan
Attorney, Agent, or Firm—Klarquist, Sparkman, Campbell, Leigh & Whinston

[57] ABSTRACT

A high pressure multi-stage valve having a pair of opposing plates, one of which has a central flow port, the plates having annular interdigitated teeth and grooves and providing for sinuous path for flow of fluid from the port to the peripheries of said plates to provide for multi-stage expansion in a single pass between the interdigitated teeth. The magnitude of interdigitation can be adjusted. The teeth are of annular form and are of truncated triangular shape in cross section and the grooves are of complementary shape. In one form of the invention, at least a substantial number of the teeth are of the same cross sectional dimensions, and the angles of the side of each tooth to the vertical are the same to provide for equal depth flow legs between the opposing sides of adjacent teeth. In another form of the invention the angularity of the sides of the teeth change in a regular pattern from the axis outward. The valve may be actuated hydraulically, and the actuator may include a manually operated piston type pump. In one form of the invention the port is defined by a conical wall and a plug projects into the space defined by the wall, the plug having a stepped exterior complementary, anglewise, to that of the conical wall to define plural areas of restriction alternating with areas of expansion.

11 Claims, 8 Drawing Figures

HIGH PRESSURE RADIAL FLOW VALVE

BACKGROUND OF THE INVENTION

The present invention relates to a valve for handling high pressure fluids. The invention will be explained in connection with a valve for use in the oil and gas producing industry, and particularly for use at the well head.

It is common at well heads to provide chokes, sometimes called "beans" which are single point restriction devices employed to effect a high pressure drop in connection with gases, liquids and fluids, which exit the well in dirty condition, i.e., not infrequently having some entrained granular materials.

Obviously a single point restriction results in considerable wear even with tungsten carbide trim. It is not uncommon to simply retrim the high pressure choke and put it back in use, at substantial expense.

On the other hand, when handling clean fluids (liquids and/or gases) rather than resorting to single point restriction devices, it is common practice to utilize multi-staging to obtain a pressure drop.

These multi-stage valves are generally of two kinds, the first being an axial flow and the second being radial flow.

The U.S. Pat. No. 3,485,474 to Baumann shows a typical multi-stage valve of the axial flow type, in which the ribs or protrusions 27 of progressively increasing size are provided on an axially disposed shaft. The ribs are disposed in a cooperative relationship with recesses formed in the body, to provide plural throttling stations. At each station there are plural turns or elbows, where the fluid path includes an inner axial leg, followed by an outward radial leg, in turn followed by an outer axial leg, followed by an inward radial leg.

The shaft can be adjusted axially. This is said to vary, at each station, the depth H of the path of the outward radial leg, while maintaining constant the depth W of the path at the outer axial leg. However, whatever change in flow path depth that occurs in the outward radial leg, the opposite change in flow path depth occurs in the inward radial leg, at each of the throttling stations. Thus, only at the midpositions of the ribs or protrusions are the depths of the two radial paths of a station equal.

In FIG. 4 of Baumann, protrusions are formed in an intermeshing pattern to provide grooves, so that the fluid is again forced to change directions with the resultant loss in pressure while passing from one circular groove to the next.

Typical of the second type of valve are the valves shown in patents such as Bates Re. No. 31,105 and U.S. Pat. No. 3,984,716 to Barb in which multiple plates are provided, with fluid flowing radially between opposed plates, there being a plunger to select how many of the annular paths are to be used.

The U.S. Pat. No. 4,205,696 to Gongwer shows a throttling valve in which the fluid flows radially between multiple plates, and wherein the spacing between the plates can be varied by axially moving the plates relative to one another, until the seating of certain heads of alternate plates on seating surfaces provided by adjacent plates.

Reference is also made to the Canadian Pat. No. 963,356, to A. Sultan issued Feb. 25, 1975. This patent does not actually show multiple staging, but is essentially a single stage pressure drop valve for use in handling water in cooled nuclear reactors. However, two concentric annular lands are arranged to intermesh as the closure member approaches the port member to define a flow path which has several changes of direction of flow, sudden enlargements and contractions of flow area, thereby said to produce velocity head losses at low rates of flow through the valve.

Multi-staging valves have been considered unsuitable for use at well heads, because the multi-staging valves frequently have restricted passages and/or orifices which can quickly become clogged with the dirt and grit entrained in the well head fluids.

The design requirements for an effective choke in oil field operations are formidable. There are a multiplicity of applications in any given oil field and every well is different, yet the operators desire one type of control device. Also, the nature of the problem changes with maturing of fields. Further, fluid can and does carry sand and large particles which break from the producing formations, with the result at the choke of erosion and plugging. Chokes must have wide control rangeability. They should be corrosion-resistant, including conformance to material requirements for H2S handling. They need to handle liquids, gases, or mixtures thereof equally well, and to be cavitation-free as well as noise-free.

It is a primary purpose of the present invention to provide a valve capable of meeting the above requirements, and which does so by means of pressure reduction in multiple stages, but in a single radial flow path, wherein the valve is so configured and designed that it has a self-cleaning feature enabling it to handle dirty fluids without becoming clogged.

My valve has a pair of opposed plates with interdigitated annular elements or teeth to form a single generally sinuous radial flow path wherein the volume of the annular zones increases progressively from the center outward to provide for a staging of the pressure drop, and wherein the elements have angular faces, so that as the plates are moved toward and away from one another, the depth or thickness of the sinuous path is varied to thereby vary the flow through the valve under controlled conditions.

A further object is to provide a valve as just described which is so constructed that the depth of the various legs of the flow path are varied equally in order to maintain cross section continuity, and so that the depth of the restricted passages is directly proportional to adjustment or lift.

A still further object is to provide a valve wherein the angles of the teeth are varied to attain a progressive change in the depths of the flow path legs.

It is a primary object of the invention to provide a high pressure multiple stage valve which can handle dirty fluids and which achieves multiple staging by a unique configuration and arrangement of the parts.

Various other objects of the present invention will be evident from the accompanying drawings, wherein.

DESCRIPTION OF A PREFERRED EMBODIMENT

Figure 1:
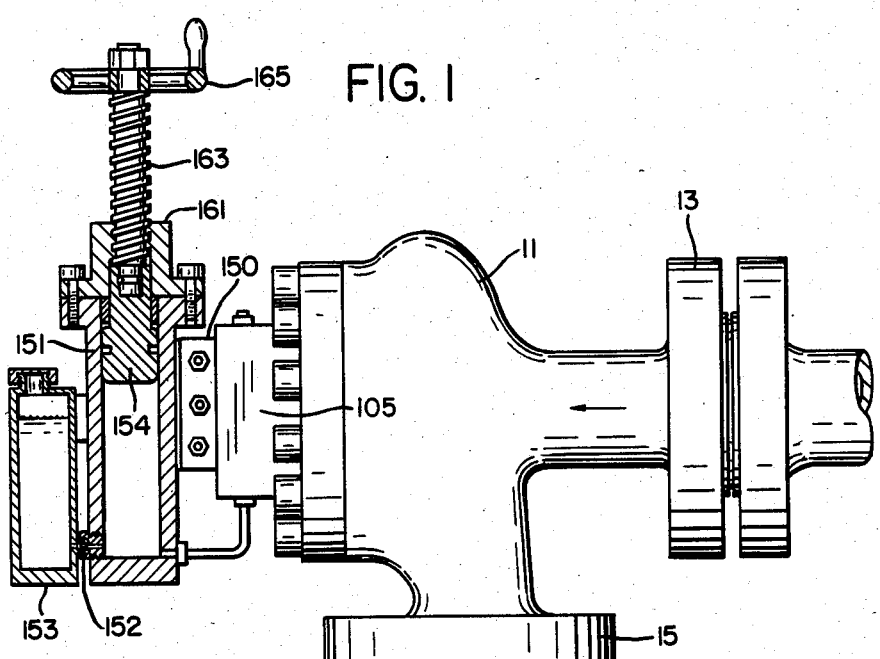
FIG. 1 is a side elevational view, partly in section, of a valve incorporating the concepts of the present invention, showing the valve equipped with an integrated power actuator.

Referring to the drawings, the valve comprises a valve body generally entitled 11, having an inlet flange 13 and an outlet flange 15, the flow path right angling interiorly of the valve.

The body is formed with an internal cavity 17 (FIGS. 2 and 2A), there being an inlet passage 18 (FIG. 2) to and an outlet passage 19 from this cavity. The cavity is closed by a bonnet 31 secured by bolts 33 to the body.

Within the cavity is a first plate-like annular valve member 41 and a second plate-like member 43, the two members having interdigitated annular portions provided by a series of alternating annular ribs or teeth 45 and grooves 47, on member 41, and ribs or teeth 49 and grooves 51 on the second valve member.

Figure 2:
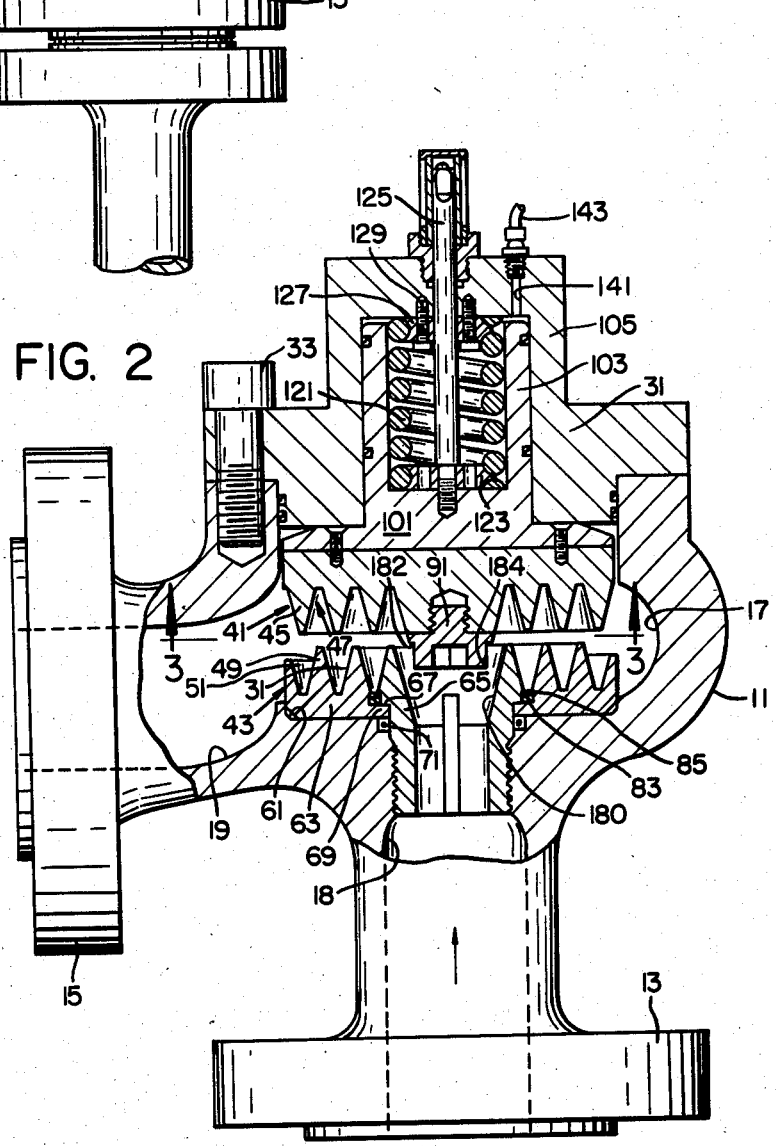
FIG. 2 is an enlarged cross sectional view through the valve proper, but showing a pipe for connection to an existing power source.

As is evident from FIG. 2, the ribs and grooves are of identical cross sectional configuration, being of truncated triangular form, providing faces which are inclined to the horizontal as the parts are shown in FIG. 2, with the faces being of distinctly acute form; that is, the faces are relatively steep and thus distinctly of a minor acute angle.

The cavity is formed with a shallow socket 61 within which valve member 43 fits. The valve member is comprised of two primary sections, an outer section 63 and an inner section 65. The inner section is essentially of tubular form and is threadedly received in the inlet passage 18 of the body 11 and has an overhanging shoulder 67 clampingly engaging an inner flange portion 69 of the outer member 63. Clamping of the outer section 63 in place, clamps a seal 71 into a sealing relationship between the inner section, outer section and the body.

An O-ring 83 is provided between the adjacent teeth of the inner and outer sections, and annular washer-like member 85 overlies the O-ring seal and underlies shoulders on the associated teeth. Thus, clamping of the outer section in place also applies a degree of pressure to the O-ring to create a seal at its location.

The second valve member 41 is essentially one piece, although it does have a central turbulence-creating element 91 threaded into the center of the valve member.

The second valve member is carried by a lower flanged portion 101 of a piston 103 which is slidably received in a cylinder portion 105 formed in the bonnet 31. Suitable seals are provided between the piston and the cylinder.

A coiled tension spring 121 is accommodated within a cavity in the upper portion of the piston. The lower end of the spring is clamped against the bottom wall of the cavity by an adapter 123, the adapter being secured to the bottom of the cavity by a shaft 125 which threads into the cylinder. The shaft slidingly projects upwardly through a second adapter 127 and then through the cap portion of the bonnet. The adapter is secured by bolts 129 to the cap portion of the bonnet.

It is evident that the tension spring at all times urges the second valve member upwardly and away from the first valve member. FIG. 2 shows the fully open position of the valve, in which the teeth of the two valve members are separated, rather than being interdigitated, which is the operative relationship of the teeth.

The shaft provides an indicator at its upper portion of the position of the second valve member relative to the first (as will be presently explained).

Fluid under pressure can be supplied to the piston through a passageway 141 formed in the cap portion of the bonnet and a pipe 143 which is connected to a source (not shown) of fluid under pressure, it being assumed that at the installation site, a pressure source is available. When pressure is applied to the pipe 143 by appropriate operation of a valve (not shown), fluid under pressure is supplied to the pipe 143 to thus supply fluid pressure to the piston. This causes the second valve member to move the first valve member 41 downwardly toward the second valve member against the resistance of the spring 121, to cause the ribs or teeth on the two valve members to assume an interdigitated relationship, the amount of which is dependent upon the amount of pressure supplied.

Figure 5:
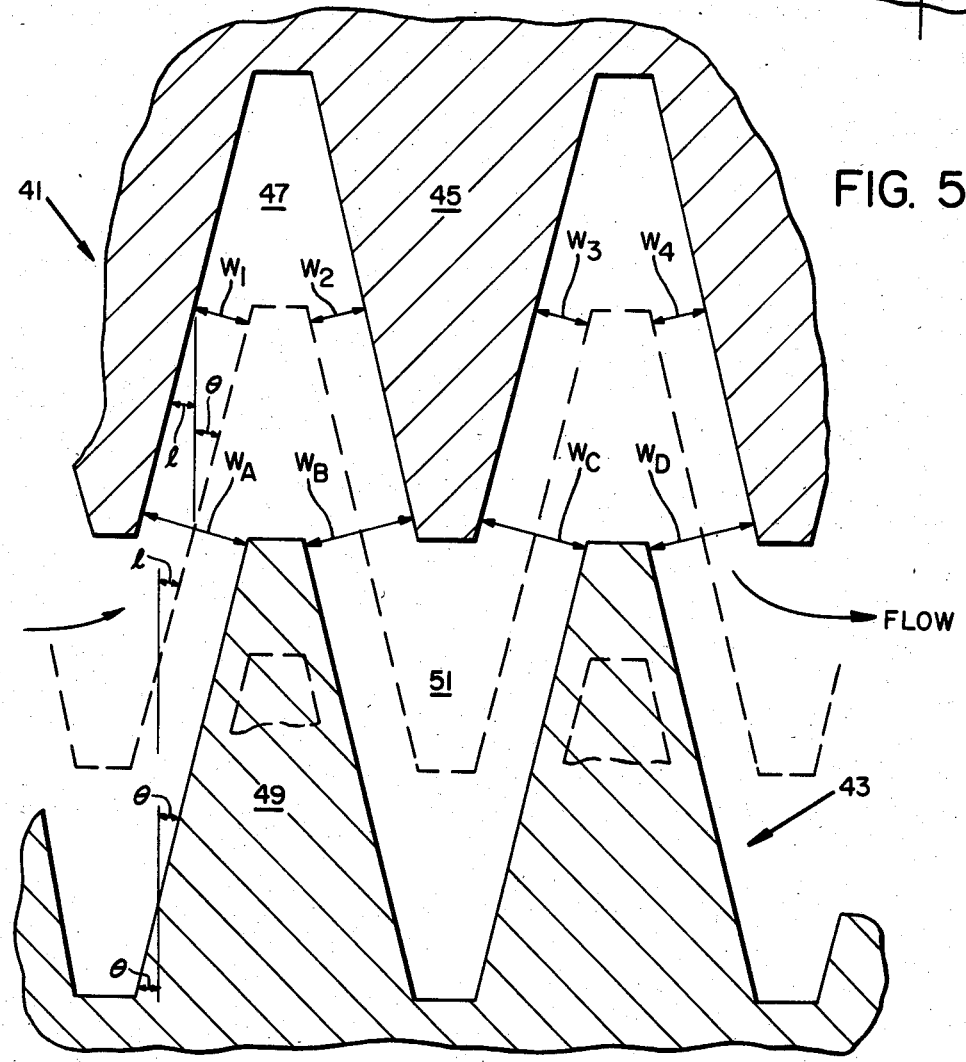
FIG. 5 is a fragmentary cross section through teeth of the FIG. 2 valve.

Referring to FIG. 5, it is evident that when the teeth 45 and 49 are interdigitated, there is, at each tooth and its corresponding valley or groove, an upflow path leg followed by a downflow path leg, with a transition zone at the apex of the tooth. The depth of each leg of the flow path, labeled $W_A$ for one "up" leg in FIG. 5, and $W_B$ for the "down" leg, are equal.

When the teeth are interdigitated to the dotted line positions in FIG. 5, it is evident that the depth of the flow passages provided by the "up" and "down" legs have been reduced to $W_1$ and $W_2$, but the depth of these legs remain equal to one another. That means that there is cross sectional continuity during all positions of adjustment, and that the depth of the restricted passages is directly proportional to adjustment or lift.

Thus, not only will the area or volumes of the grooves 47 and 51 increase from the axis outward, thus obtaining the desired progressive increase in area or volume to provide the desired progressive high pressure fluid let down, but since the legs, at any position of adjustment, are of the same depth, this carries on the progressive outward increase in area or volume, to avoid discontinuities of the pattern.

In the event that a source of pressure is not available at the installation site, which frequently occurs, an integral pressure source may be provided in the form of an actuator cylinder 151 (FIG. 1) mounted on the valve body. The mounting may be by way of an angle plate which is located to one side of the indicator shown in FIG. 2 so that the indicator is exposed for view. As shown, angle plate 150 is bolted to the bonnet, and carries the cylinder.

The cylinder has a long bore but a small diameter, and is connected to a reservoir 153 carried by the cylinder. There is a one way ball check valve 152 between the reservoir and the cylinder, preventing the passage of hydraulic fluid from the cylinder into the reservoir but permitting flow of fluid from the reservoir into the cylinder, when make up fluid is needed.

A piston 154 sealingly and slidably engages the interior of the cylinder. The upper end of the cylinder is closed by a cap 161 which threadedly receives an actuating screw 163 which has a rotary connection with the piston. The piston may have a keyed fit with the cylinder or cap to prevent it from rotation. The actuating screw has a handle 165 by which it may be operated. Instead of a manual actuator, any number of automatic power actuators can be substituted.

In operation, when the lead screw is rotated, this action drives the piston into the cylinder to create a substantial pressure therein which is directed by the pipe 143 into the cylinder for the piston 105 for the valve proper, to move the second valve member toward the first. This causes the annular ribs or teeth on the two valve members to assume an interdigitated relationship, which is the operative relationship of the parts. Now, it is evident that the depth or thickness, as it were, of the sinuous path provided by the alternating ribs and grooves, may be varied by moving the second valve member a desired extent relative to the first. This varies the pressure drop in accordance with the requirements of the particular installation in question.

The valve has a self-cleaning action particularly when the valve is moved to the fully opened position shown in FIG. 2 because there are no small pores or passages, and fluid flowing through the valve can readily dislodge granular or particle material in the grooves of the two valve members.

Figure 3:
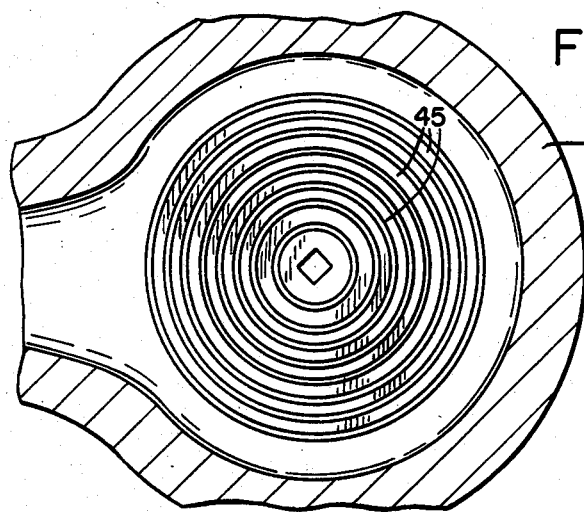
FIG. 3 is a fragmentary sectional view taken along lines 3—3 of FIG. 2.

Referring to FIGS. 2 and 3, the member 91 projects down into a conical opening 180 formed in member 65 to create additional places of restriction, depending on the configuration of the member 91. As the member is shown in FIG. 2, it has a step at 182, this step plus the bottom corner 184 of the element 91 creating two places of restriction within the conical opening 180 (when the valve members are in their interdigitated operative relationship).

Figure 4:
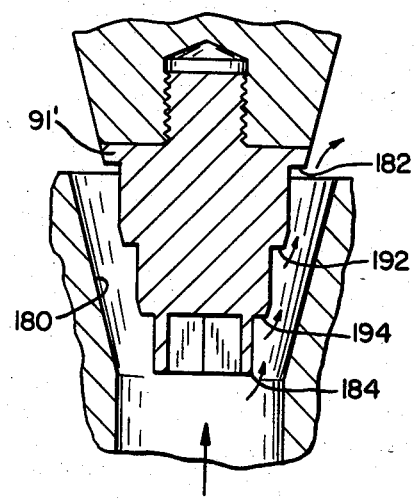
FIG. 4 is a fragmentary sectional view showing an alternate nose plug construction.

FIG. 4 shows a nose plug 91' within the conical opening 180, there being not only a step 182, but also a step 192 and a step 194, and finally the bottom corner step 184. This creates four preliminary zones of restriction for preliminary expansion stages of the fluid before entering the sinuous path provided by the teeth of the valve members 41 and 43. Note that the steps progressively increase in size generally following the contour of the cavity 180 so that the area or volume following each step progressively increases.

Figure 2A:
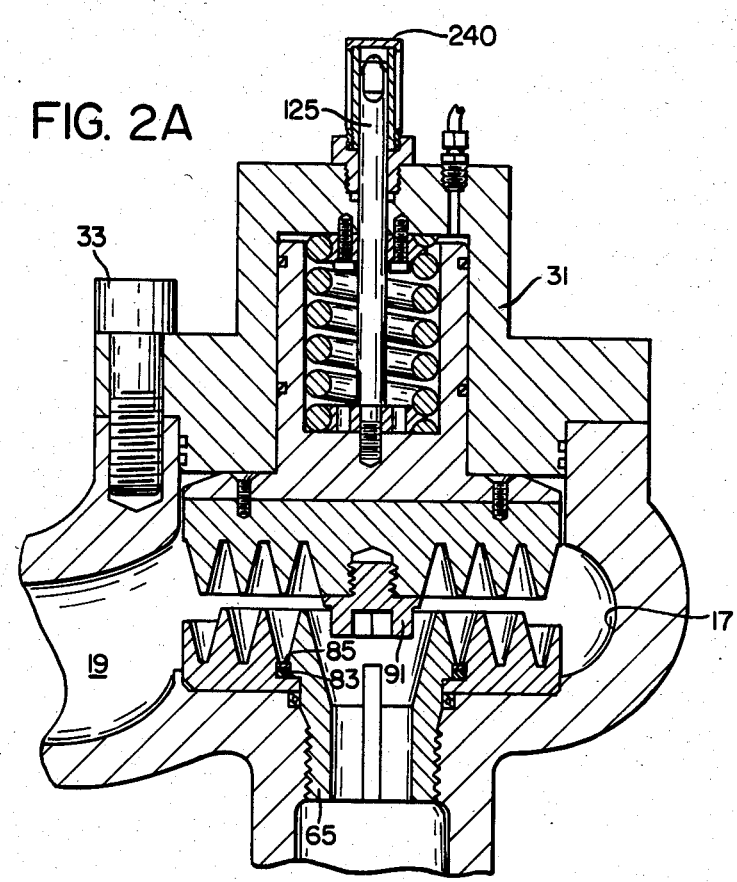
FIG. 2A is a view like FIG. 2 but showing the flanges removed.
Figure 2B:
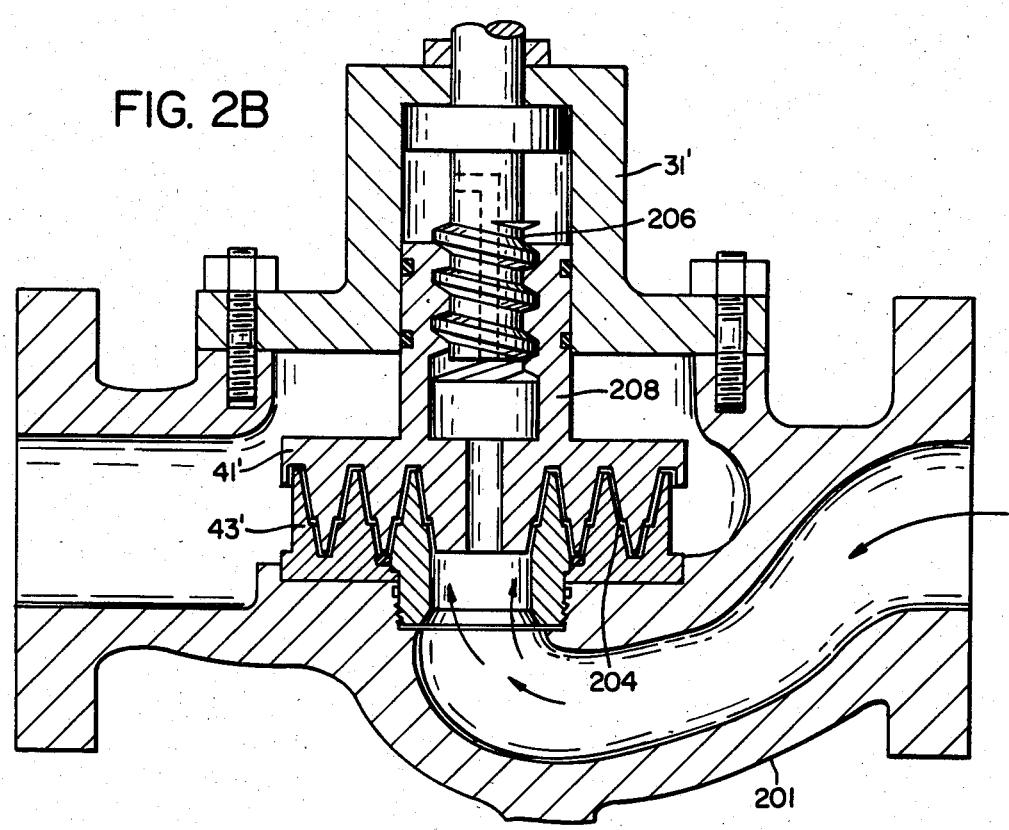
FIG. 2B is a cross section of a valve like FIG. 2, but showing a screw actuator.

FIG. 2B shows the concepts of the invention incorporated in a body 201, there being a first valve member 41' and a second valve member 43' which are shown in a condition of interdigitation. Note that each tooth has a step 204 provided in each side face thereof, the steps on one tooth being complementary to steps on the adjacent teeth.

The bonnet 31' is shown as housing a screw 206 threading into an upper sleeve like portion 208 of the upper valve member 41'. The screw 206, in certain installations, might be manually actuated, although power actuation is normally contemplated because of the substantial pressures being handled by the valve.

Figure 6:
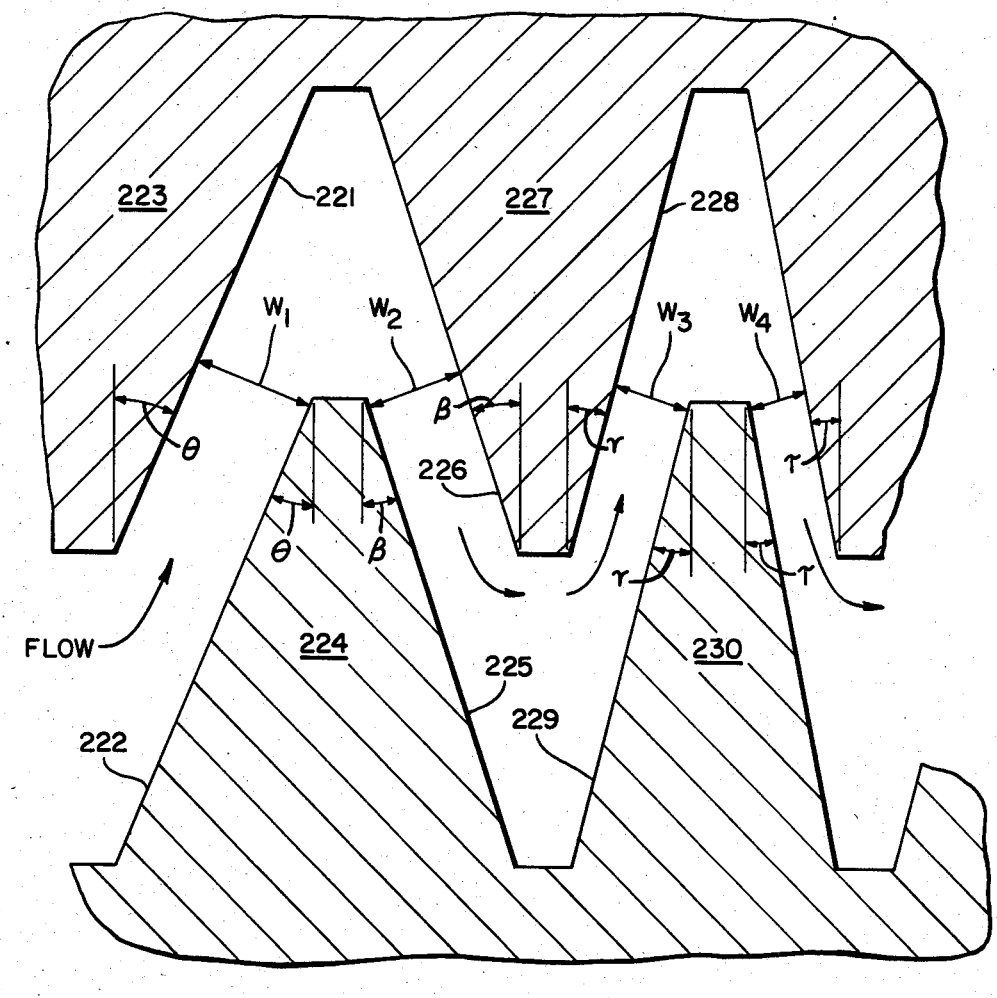
FIG. 6 is a fragmentary cross section through the teeth of a modified valve, wherein the angles of the sides of the teeth vary.

FIG. 6 shows a different kind of tooth formation in which the angles of the sides of the teeth progressively get steeper radially outwardly, so that the depth of the flow passage legs progressively decreases from the axis outwardly. That is to say, the depth $W_1$ is greater than the depth of the leg at $W_2$, which in turn is greater than the depth of the leg at $W_3$, which again in turn is greater than the depth of the leg at $W_4$. Note that there is a progression of reducement of the depth of the flow passage legs.

It is therefore evident from FIG. 6 that while the sides 221 and 222 of the teeth 223 and 224 are parallel, they are a different angle from the sides 225 and 226. Side 226 of tooth 227 has its other side face 228 of a sharper angle than 226 but nevertheless parallel to side 229 of tooth 230.

The indicator for indicating the extent of interdigitation, mentioned previously, includes the shaft 125 which projects upwardly into an indicator cage 240 (FIG. 2A). There are suitable markings either on the cage or on the upper end of the shaft, and a reference line provided on the element not having the markings, so that the amount of interdigitation of the teeth can be readily determined visually.

It is evident from the above description that the interdigitated teeth configurations provided in FIG. 2 provide a single sinuous radial flow path from a central port to the peripheries of the plates and from the peripheries directly to the outlet. It is further evident that the areas or volumes provided by the increasing diameter grooves provides for a progressive decrease in pressure drop. It is still further evident that since the various flow path legs provided by the interdigitated teeth are of equal depth on either side of each tooth, that the increase in effective groove volume is progressive in a predetermined sequence so that the high pressure fluid has its pressure progressively decreased as it moves outwardly from the central opening 180 of the lower valve member to the peripheries of the valve members.

What is claimed is:

1. A valve having a valve body,
said body being formed with a cavity and also being formed with an inlet to said cavity and an outlet from said cavity, both being in direct communication with said cavity,
means within said cavity providing for pressure reduction by multiple stages,
said means comprising a single pair of opposed plates one of which has a central port in direct communication with said inlet,
said plates having alternating annular teeth and grooves in interdigitated relationship providing a single generally sinuous radial flow path from said port to the peripheries of said plates and from said peripheries directly to said outlet,
said teeth and grooves being of truncated triangler shape in cross section,
the teeth of one plate mating with the grooves of the other plate so that said plates when closed reduce the depth of said flow path to substantially zero,
and means for adjusting the degree of interdigitation to vary the depth of the sinuous flow path and thus alter the degree of multiple stage pressure reduction,
and means providing, during the slightly opened position of the valve, flow channels which are long relative to the length of the transition zones, but wherein the ratio decreases as the valve progressively opens, the just mentioned means including the feature that each set of the sides of the teeth of one plate are parallel to the associated sides of the other plate, and wherein the sides are steep by having a minor acute angle to the vertices of the teeth.

2. A valve having a valve body,
said body being formed with a cavity and also being formed with an inlet to said cavity and an outlet from said cavity, both being in direct communication with said cavity, means within said cavity providing for pressure reduction by multiple stages, said means comprising a single pair of opposed plates one of which has a central port in direct communication with said inlet, said plates having alternating annular teeth and grooves in interdigitated relationship providing a single generally sinuous radial flow path from said port to the peripheries of said plates and from said peripheries directly to said outlet, and means for adjusting the degree of interdigitation to vary the depth of the sinuous flow path and thus alter the degree of multiple stage pressure reduction, and means providing, during the slightly opened position of the valve, flow channels which are long relative to the length of the transition zones, but wherein the ratio decreases as the valve progressively opens, the just mentioned means including the feature that each set of the sides of teeth of one plate are parallel to the associated sides of the other plate, and wherein the sides are steep by having a minor acute angle to the vertices of the teeth.

3. A valve as recited in claim 2 wherein said teeth and grooves are of truncated triangular shape in cross section.

4. A valve as recited in claim 3 in which the angular inclination of the sides of each tooth to the vertical are the same whereby to provide flow path legs of the same depth between opposing sides of adjacent teeth to thereby provide for a regular progression of the increase in size of the annular flow path zones provided by the annular interdigitated teeth.

5. A valve as recited in claim 3 in which the angular inclination of the sides of the teeth change in a regular pattern from the axis outward.

6. A valve as recited in claim 3 in which there are tension spring means for biasing the plates apart,
  a piston connected to one of said plates and operable when supplied with fluid under pressure to vary the interdigitation of the teeth in accordance with the magnitude of the pressure supplied.

7. A valve as recited in claim 6 in which there is a manually actuatable hydraulic piston and cylinder unit operatively connected to said piston to supply fluid pressure thereto.

8. A valve as recited in claim 3 in which said port is defined by a conical wall,
  and a plug on the other of said plates projecting into the space defined by said conical wall,
  said plug having a stepped exterior complementary to the angularity of said conical wall to define plural areas of restrictions alternating with areas of expansion.

9. A valve as recited in claim 3 in which at least a substantial number of said teeth are of the same cross sectional dimensions.

10. A valve as recited in claim 1, in which said one plate comprises an outer ring-like part, and an inner part, said inner part being threadedly engaged in said valve body and having a shoulder in clamping engagement with the inner margin of said outer part to clamp the same in position and make field replacement accomplished readily.

11. A high pressure valve having opposed valve members,
  said valve members having interdigitated annular ribs and annular recesses to provide a generally sinuous flow path,
  means for conducting fluid from an axial location outwardly along the sinuous flow path for passage therethrough,
  and means for varying the spacing between said valve members to vary the width of said sinuous flow path while maintaining its sinuous form,
  said annular ribs and annular recesses comprising interdigited truncated teeth of truncated equilateral form,
  and means providing, during the slightly opened position of the valve, flow channels which are long relative to the length of the transition zones, but wherein the ratio decreases as the valve progressively opens, the just mentioned means including the feature that each set of the sides of the teeth of one plate are parallel to the associated sides of the other plate, and wherein the sides are steep by having a minor acute angle to the vertices of the teeth.

* * * * *